UNITED STATES PATENT OFFICE.

THOMAS HAROLD DURRANS, OF OXFORD, ENGLAND, ASSIGNOR TO A. BOAKE ROBERTS & CO. LIMITED, OF LONDON, ENGLAND.

MANUFACTURE OF ORGANIC-ACID ANHYDRIDS AND CHLORIDS.

1,326,040.    Specification of Letters Patent.    Patented Dec. 23, 1919.

No Drawing.    Application filed July 10, 1918.    Serial No. 244,299.

*To all whom it may concern:*

Be it known that I, THOMAS HAROLD DURRANS, a subject of the King of Great Britain, residing at 245 Woodstock road, in the city and county of Oxford, England, have invented new and useful Improvements in the Manufacture of Organic-Acid Anhydrids and Chlorids, of which the following is a specification.

In the manufacture of acetic anhydrid by the joint action of chlorin and sulfur dioxid on an acetate, there is great difficulty in bringing the substances into reaction because the acetate does not readily absorb the chlorin and sulfur dioxid.

It has been proposed to overcome the difficulty by first causing the chlorin and sulfur dioxid to react in acetic anhydrid and then mixing with an anhydrous acetate, the sulfuryl chlorid thus obtained.

The present invention is based on the discovery that chlorin and sulfur dioxid are absorbed with great readiness by a mixture of an anhydrous acetate of the alkali, or alkaline-earth, series with a body of the following character, viz:—an ester resulting from the union of an alcohol, or a phenol, with an organic acid, these being compounds of carbon, hydrogen and oxygen only; an ester resulting from the union of an alcohol, or a phenol with an inorganic acid; an organic oxid, or ether; a hydrocarbon; an aldehyde; a phenol, or an acetal.

The proportion of the substance so employed may be but small; for example, about one per cent. of the weight of the acetate will be sufficient in the case of the employment of, for instance, tri-cresyl-phosphate as the said substance.

As an example of how this invention may be carried into effect I give the following, to which however I do not limit myself.

One hundred parts by weight of an anhydrous alkali acetate, or of an anhydrous alkaline earth acetate, and one part by weight of ethyl-acetate, are well mixed together and placed in a vessel capable of being closed, and provided with means for the introduction of the chlorin and sulfur dioxid and the passage thereof into, or over, the contents of the vessel. It is advantageous to cool the said vessel during the operation, but this is not essential. When the calculated quantity, or thereabout, of the mixed chlorin and sulfur dioxid necessary for producing acetic anhydrid has been absorbed the acetic anhydrid so produced can be separated from the mixture by distillation, or other suitable means.

By suitably adjusting the proportion of chlorin absorbed acetyl chlorid can be produced. This can be effected in a similar manner to the foregoing.

The invention can be applied, in a similar way, to the production of other organic acid anhydrids and organic acid chlorids. For instance:—Phenyl acetic anhydrid can be produced from anhydrous sodium phenyl acetate; or butyric anhydrid can be produced from anhydrous sodium butyrate; or benzoyl chlorid can be produced from anhydrous sodium benzoate and so on.

I do not, under this application, make any claim to the manufacture, or production, of sulfuryl chlorid as claimed under my application for patent Serial No. 237106, A. D. 1918.

What I claim is:—

1. In a process of making organic acid derivatives, the step of reacting chlorin and sulfur dioxid with a mixture of alkali acetate and a body adapted to promote the reaction.

2. In a process of making organic acid derivatives, the step of reacting chlorin and sulfur dioxid with a mixture of anhydrous alkali acetate and a body adapted to promote the reaction.

In testimony whereof I have signed my name to this specification in the presence of two subscribing witnesses.

THOMAS HAROLD DURRANS.

Witnesses:
 PERCY J. PALMER,
 J. BOWELL SHAY.